No. 760,120. PATENTED MAY 17, 1904.
B. C. HICKS.
RUNNING GEAR FOR MOTOR DRIVEN VEHICLES.
APPLICATION FILED JUNE 15, 1903.
NO MODEL.
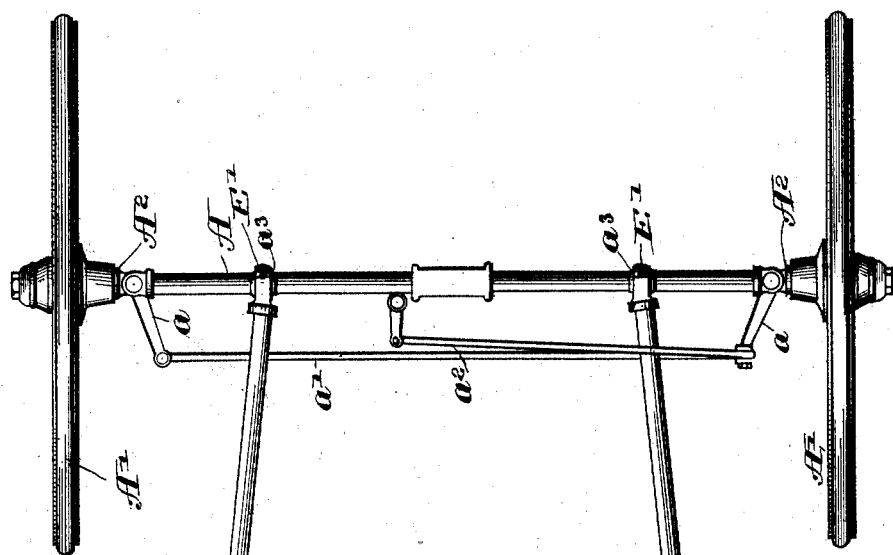
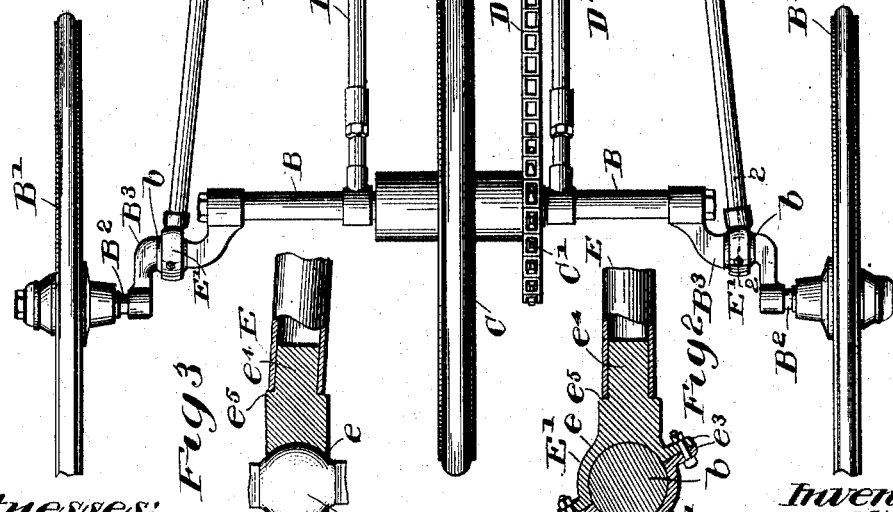

No. 760,120. Patented May 17, 1904.

UNITED STATES PATENT OFFICE.

BOHN C. HICKS, OF CHICAGO, ILLINOIS, ASSIGNOR TO CENTER DRIVE AUTOMOBILE COMPANY, OF CHICAGO, ILLINOIS, AND PIERRE, SOUTH DAKOTA, A CORPORATION OF SOUTH DAKOTA.

RUNNING-GEAR FOR MOTOR-DRIVEN VEHICLES.

SPECIFICATION forming part of Letters Patent No. 760,120, dated May 17, 1904.

Application filed June 15, 1903. Serial No. 161,460. (No model.)

*To all whom it may concern:*

Be it known that I, BOHN C. HICKS, of Chicago, in the county of Cook and State of Illinois, have invented certain new and useful Improvements in Running-Gear for Motor-Driven Vehicles; and I do hereby declare that the following is a full, clear, and exact description thereof, reference being had to the accompanying drawings, and to the letters of reference marked thereon, which form a part of this specification.

This invention relates to improvements in motor-driven vehicles, and refers more specifically to the running-gear construction of such vehicles of that class having a central drive or traction wheel which is rotatively mounted on the rear axle of the vehicle running-gear and operatively connected with the motor which drives the vehicle, and side supporting-wheels rotatively mounted on spindles which are connected with the central part of the rear axle and are axially out of line with the axis of said drive or traction wheel.

The invention consists of the matters hereinafter set forth, and more particularly pointed out in the appended claims.

In the drawings, Figure 1 is a plan view of a vehicle running-gear, showing the application of my invention thereto. Fig. 2 is a detail section taken on line 2 2 of Fig. 1. Fig. 3 is a top plan view, partially broken away, of the device shown in Fig. 2.

As shown in the drawings, A designates the front axle, and B the rear axle, of the running-gear frame.

A' B' designate the front and rear wheels, respectively, of the running-gear frame. The front axles are mounted on the usual axle stubs or spindles $A^2$, which are hinged to the main part of the axle, and said spindles are provided with rearwardly-extending arms $a$, adapted for connection with rods or bars $a'$ $a^2$ of the steering-gear mechanism. The rear wheels B' are rotatively mounted on spindles $B^2$, which are formed on or made integral with cranks $B^3$, which latter are rigidly connected at their inner ends with the central part of the rear axle B.

C designates a center drive or traction wheel which is rotatively mounted on the central part of the rear axle B. Said wheel C is driven by means of a motor D of any preferred type through the medium of a link belt D', trained over a pinion $d$ on said motor, and a sprocket-wheel C', fixed to the hub of the wheel C.

E E designate the longitudinal side members or reaches of the vehicle-frame, which are connected at their front ends with the front axle and at their rear ends with the cranks $B^3$ of the rear axle B. The motor D is supported at its front ends from a cross-bar F, which extends between and is connected at its ends to the reaches E, it being swung from a part $d'$, loosely connected at its upper end with said cross-bar F and at its lower end with the casing of the motor in the manner shown in my copending application for United States Letters Patent No. 161,459, filed June 15, 1903. Said motor is supported from the rear axle by means of supporting-rods $D^2 D^2$, which are attached at their front ends to lugs $d^2$ on the sides of the motor-casing and are loosely connected at their rear ends with the rear axle on either side of the central driving-wheel C.

By reason of the connection of the central part of the rear axle B with the spindles $B^2$ thereof through the medium of the cranks $B^3$ said central part of the axle B is located eccentric to or out of alinement with the axis of rotation of the wheels B' B'. This arrangement is provided in order to permit the axle and the central drive-wheel C carried thereby to move vertically relatively to the side wheels B' B' when the vehicle is passing over an uneven roadway and at times, therefore, when the central or side wheels are passing over depressions or elevations in the roadway. The rear axle has, therefore, a rocking movement in the vehicle-frame, such as will permit said axle and the central wheel to rise and fall when the central drive-wheel C is passing over elevations and depressions in the roadway, the axis of such rocking or oscillatory movement being the axis of the spindles $B^2$ and said spindles turning in the hubs of the wheels $B'$ to permit such movement.

The reaches E are connected at their front and rear ends with the front and rear axles by loose-fitting joints or connections, which permits free movement between the reaches and axles during the rocking action of the rear axle above mentioned, thereby giving flexibility to the frame and preventing binding between the intermoving parts of the frame. The flexible construction employed is also designed to prevent undue stress and strains being brought upon the frame members of the running-gear due to shocks resulting from passing over rough and uneven roadways. These features of my construction are made as follows: The reaches, which are preferably made of tubing, are provided at their ends with fittings $E'$, (shown more clearly in Fig. 2,) which are so constructed as to be fitted over the front axle and the cranks of the rear axle and are provided with spherical inner bearing-surfaces which engage spherical protuberances $a^3$ $b$ on the front axle and on the rear axle-cranks, respectively. Said fittings are divided to permit them to be assembled on said axle and cranks, being made of two parts $e$ $e'$, which are joined by bolts $e^2$, extending through lugs $e^3$, as more clearly shown in Fig. 2. The parts $e$ of said fitting are provided with shanks having reduced parts which fit into the ends of the tubular reaches, said reaches abutting against annular shoulders $e^5$ on said shanks. The fittings may be attached to the reaches by brazing or other suitable means. The fittings are preferably divided obliquely to permit the same to be readily connected with the shaft or cranks when the parts are in their usual or horizontal positions.

By reason of the rounded or spherically-formed engaging faces of the fittings $E'$ and the protuberances $a^3$ $b$ of the front-axle and rear-axle cranks said reaches when connected with said axle and cranks by the fitting described are held from lateral displacement and at the same time are permitted to rotate upon the parts with which they are connected and to have considerable freedom of movement in other directions. Moreover, by reason of such loose connection between said parts no binding of the parts is experienced during the relative movements of the parts, even though the frame be under a torsion or twisting strain during said movement.

Certain changes in the structural details may be made without departing from the spirit of my invention, and I do not wish to be limited to the exact details shown except as hereinafter made the subject of specific claims.

I claim as my invention—

1. A vehicle running-gear, the combination of side reaches, a crank-axle mounted in said gear in a manner to rock therein, a central drive-wheel rotatively mounted on said axle, and side wheels rotatively mounted on spindles carried by the cranks of the axle, said reaches being connected with the cranks of the axle by means permitting the reaches to flex relatively to the axle in all directions.

2. A vehicle running-gear, the combination of side reaches, a crank-axle mounted in said gear in a manner to rock therein, a central drive-wheel rotatively mounted on said axle, and side wheels rotatively mounted on spindles carried by the cranks of the axle, said reaches being connected with the cranks of the axle by ball-and-socket joints.

3. In a vehicle running-gear frame, the combination of side reaches, a crank-axle, a central drive-wheel rotatively mounted on said axle, and side wheels rotatively mounted on spindles carried by the cranks of said axle, said reaches being provided at their ends with spherical sockets and said cranks being provided with spherical protuberances which fit within said sockets.

4. In a vehicle running-gear frame, the combination of the rear axle embracing a central part and spindles which are connected with the central part of the axle by cranks, wheels rotatively mounted on said spindles, a drive or traction wheel rotatively mounted on the central part of the axle, and reaches connected with said cranks, the connection between said reaches and cranks embracing fittings which are provided with spherical sockets and spherical protuberances on said cranks which are received by said sockets, said fittings being divided diagonally to facilitate the assembling of the parts.

5. In a vehicle running-gear frame the combination of the front and rear axles, the rear axle embracing a central part and spindles which are connected with the central part thereof by cranks, wheels rotatively mounted on said front axle, wheels also mounted on said spindles, a central drive or traction wheel mounted on the central part of said rear axle, and reaches connected at their front and rear ends with the front axle and the cranks on the rear axle, respectively, by joints permitting the reaches to flex relatively to the axles in all directions.

In testimony that I claim the foregoing as my invention I affix my signature, in presence of two witnesses, this 8th day of June, A. D. 1903.

BOHN C. HICKS.

Witnesses:
 TAYLOR E. BROWN,
 JOHN F. FARGO.